United States Patent
Etoh

[11] Patent Number: 6,118,483
[45] Date of Patent: Sep. 12, 2000

[54] IMAGE SENSING APPARATUS FOR HIGH-SPEED IMAGE SENSING

[76] Inventor: Takeharu Etoh, 21-2, Aomatanihigashi 7-chome, Mino-shi, Osaka-fu, Japan

[21] Appl. No.: 08/861,075

[22] Filed: May 21, 1997

[30] Foreign Application Priority Data

May 21, 1996 [JP] Japan .................................. 8-126034

[51] Int. Cl.⁷ .................................................. H04N 5/335
[52] U.S. Cl. ........................................ 348/315; 348/319
[58] Field of Search .................................... 348/311, 315, 348/316, 317, 318, 319, 294, 297, 298; 257/222, 223, 229, 232; H04N 5/375

[56] References Cited

U.S. PATENT DOCUMENTS

| | | | |
|---|---|---|---|
| 5,182,648 | 1/1993 | Hirota | 348/316 |
| 5,291,294 | 3/1994 | Hirota | 348/316 |
| 5,355,165 | 10/1994 | Kosonocky et al. | |
| 5,600,369 | 2/1997 | Cazaux et al. | 348/218 |

FOREIGN PATENT DOCUMENTS

| | | |
|---|---|---|
| 468876 | 3/1992 | Japan . |
| 5336420 | 12/1993 | Japan . |

OTHER PUBLICATIONS

"The Study of a Photosite for Snapshot Video"; M. Elloumi, et al.; 21st International Congress on High Speed Photography & Photonics (Aug. 29–Sep. 2, 1994), Technical Program & Abstracts.

"4500 Frames/sec. High–speed Video Camera", by Takeharu ETOH, published at pp. 543–545 of vol. 46, No. 5 (1992) of Journal of Television Society.

"A Survey by Questionnaires on Use of High–Speed Image Sensing and a Proposal of a 30,000,000 Frames/sec. Video Camera", by Takeharu ETOH et al.; published at pp. 105–108 of Proceedings of the 1993 Comprehesive Symposium on High–Speed Image Sensing and Photonics (1993).

*Primary Examiner*—Tuan Ho

[57] ABSTRACT

An image sensing apparatus with an image sensor which comprises a plurality of sensors (47) each provided on each of pixel (37) forming a photo-receptive area (36), the sensor generating an electric signal in response to brightness of incident light from a subject; and a plurality of dual-function CCDs (40A–40H) for signal storage and read-out connected to the sensors, respectively, the dual-function CCDs each comprising a plurality of charge storage elements. The dual-function CCDs are of substantially linear shape, elongated over two or more of the pixels, and arranged parallel to each other. During an image sensing process, electric signals generated in the sensors of the pixels are transferred parallel in one direction by the plurality of dual-function CCDs, whereby the electric signals generated in the sensor are stored in the charge storage elements of the dual-function CCDs. During a signal read-out process, the electric signals stored in the charge storage elements of the dual-function CCDs are transferred parallel in the same direction as in the image sensing process, whereby the electric signals are read out of the photo-receptive area.

9 Claims, 11 Drawing Sheets

IMAGE SENSING APPARATUS FOR HIGH-SPEED IMAGE SENSING

BACKGROUND OF THE INVENTION

1. Field of the Invention

The present invention relates to an image sensing apparatus and, in particular, to an image sensing apparatus capable of high-speed image sensing suitable for scientific measurements such as measurement of ultra-high-speed moving objects like rockets, explosions, destructions, turbulent flows, discharge phenomena, and motions of microorganisms under a microscope.

2. Description of the Background Art

As this type of image sensing apparatus, there has conventionally been known, for example, an image converter type multi-framing camera (hereinafter, referred to as an image converter type camera). The image converter type camera adopts a system that, in an image sensing process in which an image converted into electrons at a photo-receptive area is irradiated onto a fluorescent surface with an electron gun, with the fluorescent surface divided into a plurality of areas, an electron flow is irradiated successively to the plurality of areas so that continuous image frames are displayed on one screen. This image converter type camera, in most cases, has a micro-channel plate type image intensifier (hereinafter, abbreviated as MCP type II) disposed behind the photo-receptive area and before the fluorescent surface, so that incident light is intensified. The frame rate of the image converter type camera is around $3 \times 10^7$ frames/sec., and the number of image frames that can be continuously captured (number of continuous image frames) is 10 or so.

The applicant has already provided a high-speed video camera comprising an MCP type II, wherein electric signals read in parallel from pixels are serially stored in memory provided outside the image sensor without forming an image, and the signals stored in the memory are formed into the image after the completion of image sensing, thus the video camera is enabled to implement a high-speed image sensing of 4,500 frames/sec. ("4,500 frames/sec. high-speed video camera", Takeharu ETOH, the Journal of Television Society, Vol. 46, No. 5, PP. 543–545, 1992, in Japanese).

Further, the applicant has proposed an image sensing apparatus, in Japanese Patent Laid-Open Publication No. HEI 5-336420, in which a plurality of electric signal storages are provided within each pixel, in which arrangement electric signals generated in a sensor in each pixel in response to brightness of incident light are accumulated in the electric signal storages within the pixels during an image sensing process, and read out after the completion of the image sensing process, thus the image sensing apparatus is enabled to implement high-speed image sensing.

Figure 8:
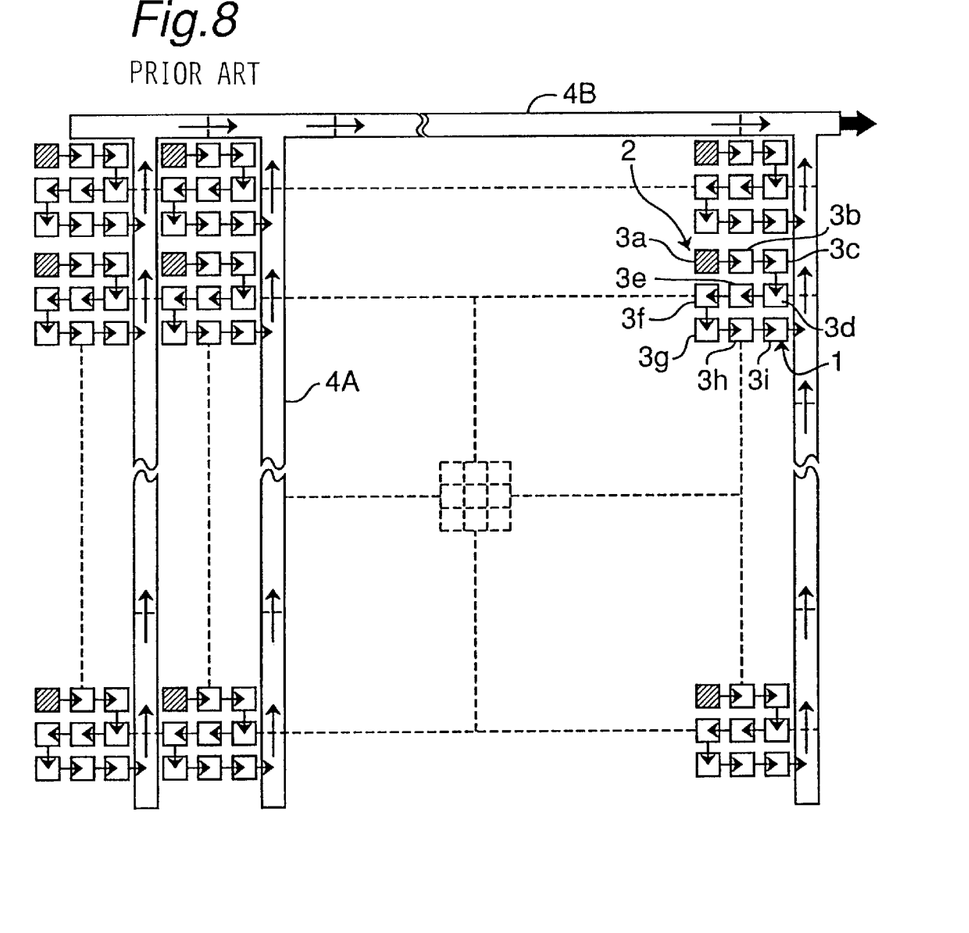
FIG. 8 is a schematic diagram showing a conventional image sensing apparatus.
Figure 9:
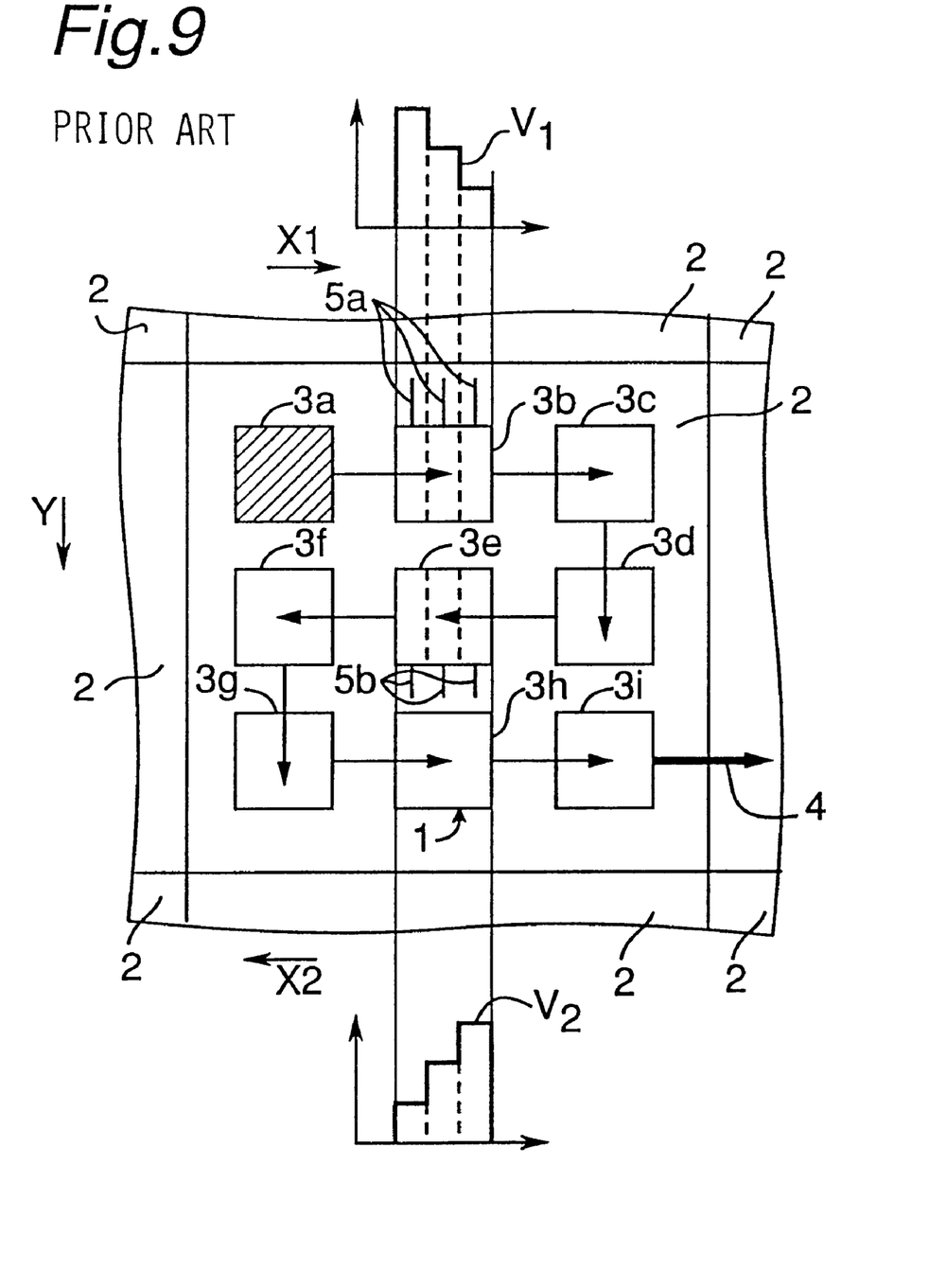
FIG. 9 is a partly enlarged view of FIG. 8.

Furthermore, as shown in FIGS. 8 and 9, there has been proposed an image sensing apparatus comprising an image sensor in which pixels 2 each having a signal storage CCD (charge coupled device) 1 are arranged in a matrix. The signal storage CCD 1 is folded by being bent four times and provided in a zigzag line within the pixel 2. During an image sensing process, one charge storage 3a out of the nine charge storages 3a to 3i for signal accumulation functions as a sensor that converts incident light into an electric signal, and the electric signal generated in the charge storage 3a is transferred and accumulated sequentially to the other charge storages 3b to 3i. After the completion of image sensing, the electric signals accumulated in the charge storages 3a to 3i of each pixel 2 are read out by signal read-out CCDs 4A, 4B ("THE STUDY OF A PHOTOSITE FOR SNAPSHOT VIDEO"; M. Elloum, E. Fauvet, E. Goujou, P. Gorria, G. Cathebras; 36st International congress on high speed photography and photonics (Aug. 29–Sep. 2, 1994), TECHNICAL PROGRAM & ABSTRACTS).

Figure 10:
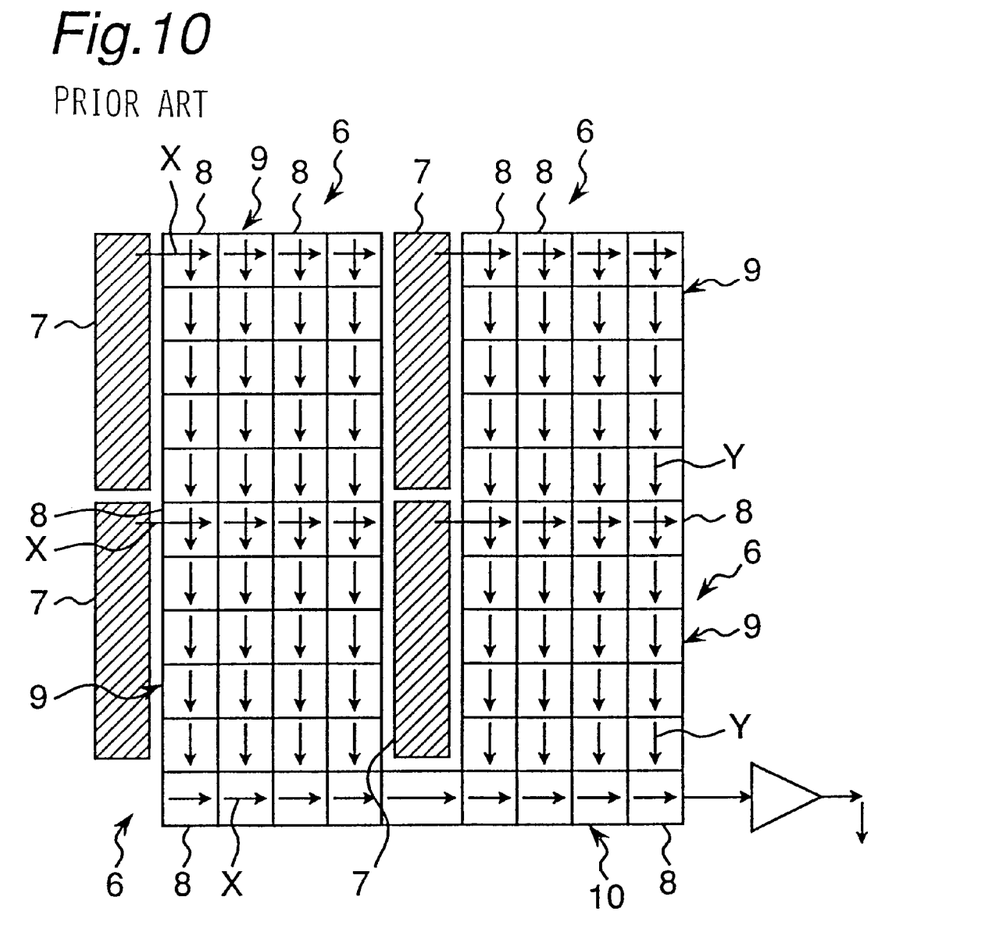
FIG. 10 is a schematic diagram showing another conventional image sensing apparatus.

Further, U.S. Pat. No. 5,355,165, as shown in FIG. 10, describes an image sensing apparatus comprising an image sensor in which each pixel 6 comprises sensor 7 and signal storage CCD 9 having 5×4 charge storages 8, 8, ... arranged in a matrix. Electric signals generated by the sensors 7 during an image sensing process are first transferred to four charge storages 8 arrayed laterally (in the right-and-left direction) in the figure as indicated by arrow X. Next, with a bend of the direction in which the electric signals are transferred, they are transferred from the four charge storages 8 longitudinally (in the up-and-down direction) in the figure as indicated by arrow Y, thus being stored in the charge storages 8, respectively. During a read-out process, the electric signals stored in the charge storages 8 of the signal storage CCD 9 of each pixel 6 are transferred toward signal read-out CCD 10, longitudinally as indicated by the arrow Y, and further transferred by the signal read-out CCD 10 in the direction as indicated by the arrow X.

Generally, the image sensing apparatus for use of scientific measurement of motions is required to meet two conditions, that is, the capabilities of firstly implementing high-speed image sensing and secondly obtaining a sufficient number of consecutive images, or allowing use as a video camera.

Figure 11:
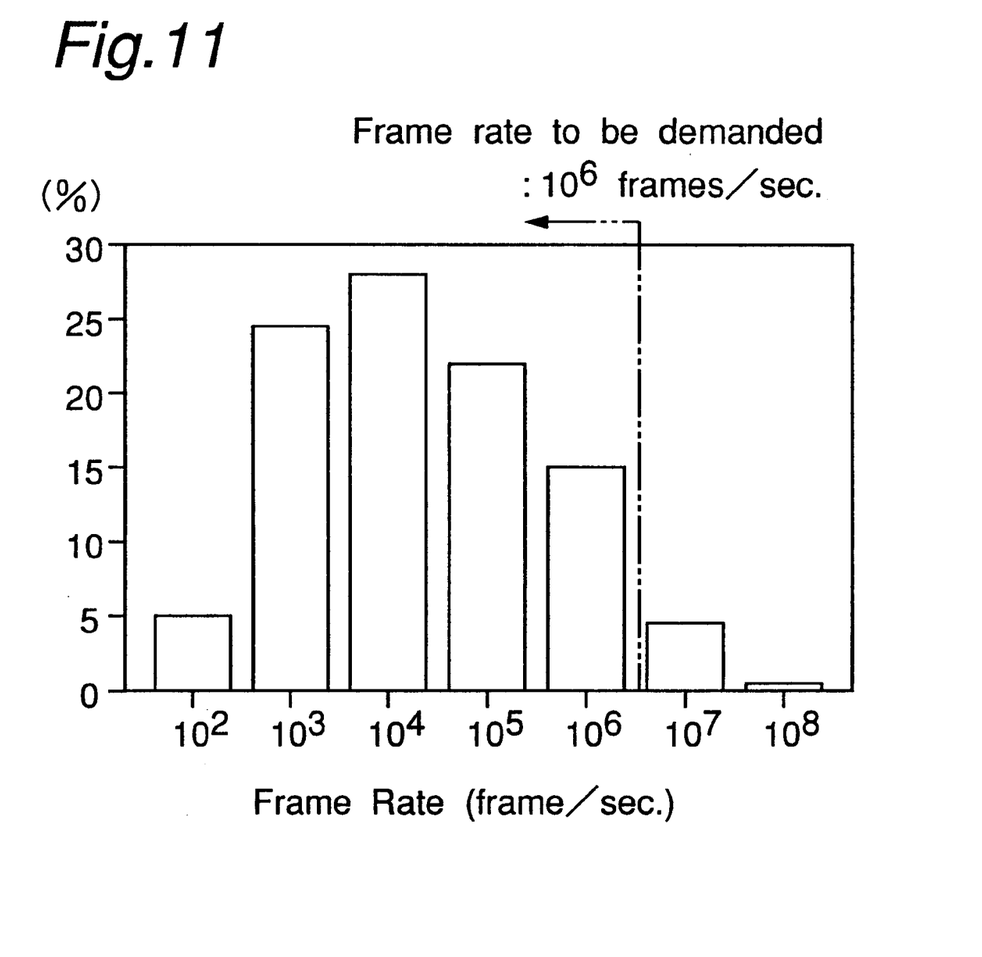
FIG. 11 is a diagram showing the relationship between frame rates of an image sensing apparatus and the ratio of users who demand the frame rates.

As to the first condition, the applicant has confirmed, as a result of questionnaires conducted on researchers who are users of image sensing apparatus for scientific measurement, that a frame rate of $10^6$ frames/sec., if obtained, satisfies the demands of most users (over 95%) as shown in FIG. 11 ("A survey by questionnaires on use of high-speed image sensing and a proposal of a 30,000,000 frames/sec. video cameras"; Takeharu ETOH, Kohsei TAKEHARA, Midori KAWAJIRI; Proceedings of the 1993 comprehensive symposium on high-speed image sensing and photonics, pp. 109–112, 1993, in Japanese).

As to the second condition, since the reproduction rate of general video cameras is 25 to 30 frames/sec. but the minimum rate that can allow man to recognize a continuous motion is 4 to 5 frames/sec., reproducing 40 to 50 continuous frames at a reproduction rate of 4 to 5 frames/sec. allows a motion image of about 10 seconds to be obtained, although the motion in the image frames lacks in smoothness more or less, in which case the camera can be used as a video camera for scientific measurement use. Like this, image sensing apparatuses for scientific measurement to be used as a high-speed video camera are required to be capable of obtaining a frame rate of $10^6$ frames/sec. and of obtaining a minimum number of continuous frames of around 40 to 50.

However, the aforementioned image converter type camera is indeed capable of obtaining a sufficient frame rate, but has a number of continuous frames as small as 10 or so, insufficient for use as a video camera. The image converter type camera also has disadvantages that the system results in large size, and that there occurs relative distortions between one and another of the continuous frames.

With 4,500 frames/sec. high-speed video cameras, as described above, the demand of users for the frame rate could not be satisfied sufficiently.

Further with the image sensing apparatus of Japanese Patent Laid-Open Publication No. HEI 5-336420, since a large number of transistors need to be controlled at one time in order to transfer electric signals to the electric signal storages during image sensing, large power consumption is involved in switching operations and besides noise generated in the switching affects the electric signals.

In an image sensing apparatus comprising the pixels 2 as shown in FIGS. 8 and 9, indeed there will occur neither lack of intensity of light nor relative distortions between continuous frames, but the number of continuous frames is as low as 9 so that the image sensing apparatus cannot be used as a video camera.

Also in this image sensing apparatus, since the charge storages 3a to 3i of the signal storage CCD 1 are arrayed in a zigzag line as described above, the drive circuit for operating the charge storages 3a to 3i of the signal storage CCD 1 becomes complex in construction, as another disadvantage. In more detail, as shown in FIG. 9, since a direction as indicated by arrow X1 in which electric signals are transferred from the charge storage 3a to the charge storage 3c and in which electric signals are transferred from the charge storage 3g to the charge storage 3i is opposite to another direction as indicated by arrow X2 in which electric signals are transferred from the charge storage 3d to the charge storage 3f, it is necessary to apply drive voltages having waveforms symmetrical to each other as shown by V1 and V2. Therefore, it is necessary that electric wires 5a for applying a drive voltage to the charge storages 3a to 3c and the charge storages 3g to 3i, and electric wires 5b for applying a drive voltage to the charge storages 3g to 3i are given by separate electric wires, and that the voltages of waveforms as shown by V1 and V2 are applied to the electric wires 5a and 5b, respectively. Besides, since a direction as indicated by arrow Y in which electric signals are transferred from the charge storage 3c to the charge storage 3d and from charge storage 3f to the charge storage 3g is perpendicular to the directions as indicated by X1 and X2, it is necessary to separately provide electric wires for applying a drive voltage to the charge storages 3d, 3f in addition to the electric wires 5a, 5b.

Further, since the signal storage CCD 1 is in a zigzag line as described before, there are bends in the direction in which electric signals are transferred. Electric signals will remain in the charge storages 3c, 3d, 3f and 3g placed at these bends in the transfer direction, which may cause deterioration of the quality of reproduced images Further in this image sensing apparatus, there is a need of providing signal read-out CCDs 4A within the photo-receptive area.

In general, the dimensions of the photo-receptive area of the pixel are about 10 mm×10 mm, whereas the number of pixels cannot be reduced below a certain level for the minimum resolution to be ensured. As a result, the area of one pixel cannot be increased over a certain level. Accordingly, in order to increase the number of signal storage CCDs and charge storages to be disposed within the pixel, it is necessary to simplify the construction within the photo-receptive area as much as possible so that a space for arranging the signal storage CCDs within each pixel is ensured. Therefore, as in the image sensing apparatus shown in FIGS. 8 and 9, if the signal read-outs CCD 4A are disposed within the photo-receptive area and if the drive circuit for the signal storage CCDs is complex, it would be difficult for the number of charge storages of the signal storage CCDs to be around 40 to 50 per pixel even if the dimensions and configuration of the CCDs are modified in various ways. Thus, the number of continuous frames necessary for use as the aforementioned high-speed video camera cannot be obtained.

Adopting the arrangement as shown in FIG. 10 allows the number of charge storages of the signal storage CCD 9 of each pixel 6 to be around 40 to 50 per pixel 6. However, since the electric signal generated in the sensor 7 is transformed first in a direction indicated by arrow X, and then in another direction indicated by arrow Y perpendicular to the X direction, the drive circuit for the signal storage CCD becomes complex as in the image sensing apparatus shown in FIGS. 8 and 9.

Also, since electric signals generated in the sensor 7 are transferred first in the direction as indicated by arrow X and then transferred in the direction as indicated by arrow Y, there are some abrupt bends in the direction in which the electric signal is transferred, as in the case of the arrangement shown in FIGS. 8 and 9. This poses a problem that electric charges will be mixed in the charge storages 8 placed at these bends, causing deterioration of the quality of reproduced image.

SUMMERY OF THE INVENTION

The present invention has been achieved to solve the above-described disadvantages of the conventional image sensing apparatuses. Accordingly, an object of the present invention is to provide an image sensing apparatus which is capable of high-speed image sensing enough to meet the demand of users who use image sensing apparatus for scientific measurement and further capable of obtaining a large enough number of continuous image frames to make a motion image so that the image sensing apparatus may be used as a video camera suitable for scientific measurement.

In order to achieve the aforementioned object, according to the present invention, there is provided an image sensing apparatus with an image sensor which comprises:

a plurality of sensors each provided on each of pixel forming a photo-receptive area, the sensor generating an electric signal in response to brightness of incident light from a subject; and a plurality of dual-function CCDs for signal storage and read-out connected to the sensors, respectively, the dual-function CCDs each comprising a plurality of charge storage elements, characterized in that:

the dual-function CCDs are of substantially linear shape, elongated over two or more of the pixels, and arranged parallel to each other;

during an image sensing process, electric signals generated in the sensors of the pixels are transferred parallel in one direction by the plurality of dual-function CCDs, whereby the electric signals generated in the sensor are stored in the charge storage elements of the dual-function CCDs; and during a signal read-out process, the electric signals stored in the charge storage elements of the dual-function CCDs are transferred parallel in the same direction as in the image sensing process, whereby the electric signals are read out of the photo-receptive area.

In this image sensing apparatus, since electric signals generated in the sensors of the pixels are transferred parallel in one direction by the dual-function CCDs provided in parallel so as to be stored in the charge storages of the dual-function CCDs, a frame rate of around $10^6$ frames/sec. is enabled.

When the total number of charge storages of the dual-function CCDs connected to the sensors is set to a desired number, a desired number of continuous frames of images can be attained. That is, if the total number of charge storages of the dual-function CCDs connected to the sensor of one pixel during an image sensing process is "A", then electric signals corresponding to the number "A" of continuous image frames are stored in the dual-function CCDs. Therefore, for example, if the total number of charge storages of the dual-function CCDs connected to the sensor of one pixel is 87, then the number of continuous image frames is 87, allowing use as a video camera for scientific use.

During a signal read process, since the electric signals stored in the charge storages of the dual-function CCDs provided in parallel are transferred parallel in the same direction as in the image sensing process, it is unnecessary to provide signal read CCDs independently of the dual-function CCDs within the photo-receptive area.

Furthermore, since a plurality of dual-function CCDs are provided in parallel and since electric signals are transferred in the same direction during both image sensing and signal reading processes, the circuit for driving the dual-function CCDs is simplified in construction.

Preferably the dual-function CCDs may be placed on a different surface from a surface on which the sensors are placed.

Preferably the image sensing apparatus further may comprise a first gating element connected between the sensor and one of the charge storage elements which are included in one of the dual-function CCDs and a second gating element connected between another charge storage element which is positioned apart from the charge storage element to which the first gating element is connected and a signal discharge element, whereby, during an image sensing process, electric signals generated in the sensors are transferred to the dual-function CCDs via the first gating element, and the electric signals in the dual-function CCDs are discharged to the signal discharge element via the second gating element, and whereby during a signal read-out process, the electric signals stored in the charge storage element of the dual-function CCDs are read out of the photo-receptive area via an end of the dual-function CCDs.

Preferably the dual-function CCDs may be partly formed into meanders. In this case, clearances may be defined between the meanders provided in one dual-function CCD and other dual-function CCDs adjacent to the dual-function CCD in which the meanders are provided. Then, the first gating element and the second gating element may be provided in the clearances.

BRIEF DESCRIPTION OF THE DRAWING

Further objects and advantages of the present invention will become clear from the following description taken in conjunction with the preferred embodiments thereof with reference to the accompanying drawings, in which.

DETAILED DESCRIPTION OF THE PREFERRED EMBODIMENT

FIGS. 1 through 7 show an image sensing apparatus according to a embodiment of the present invention.

Figure 1:
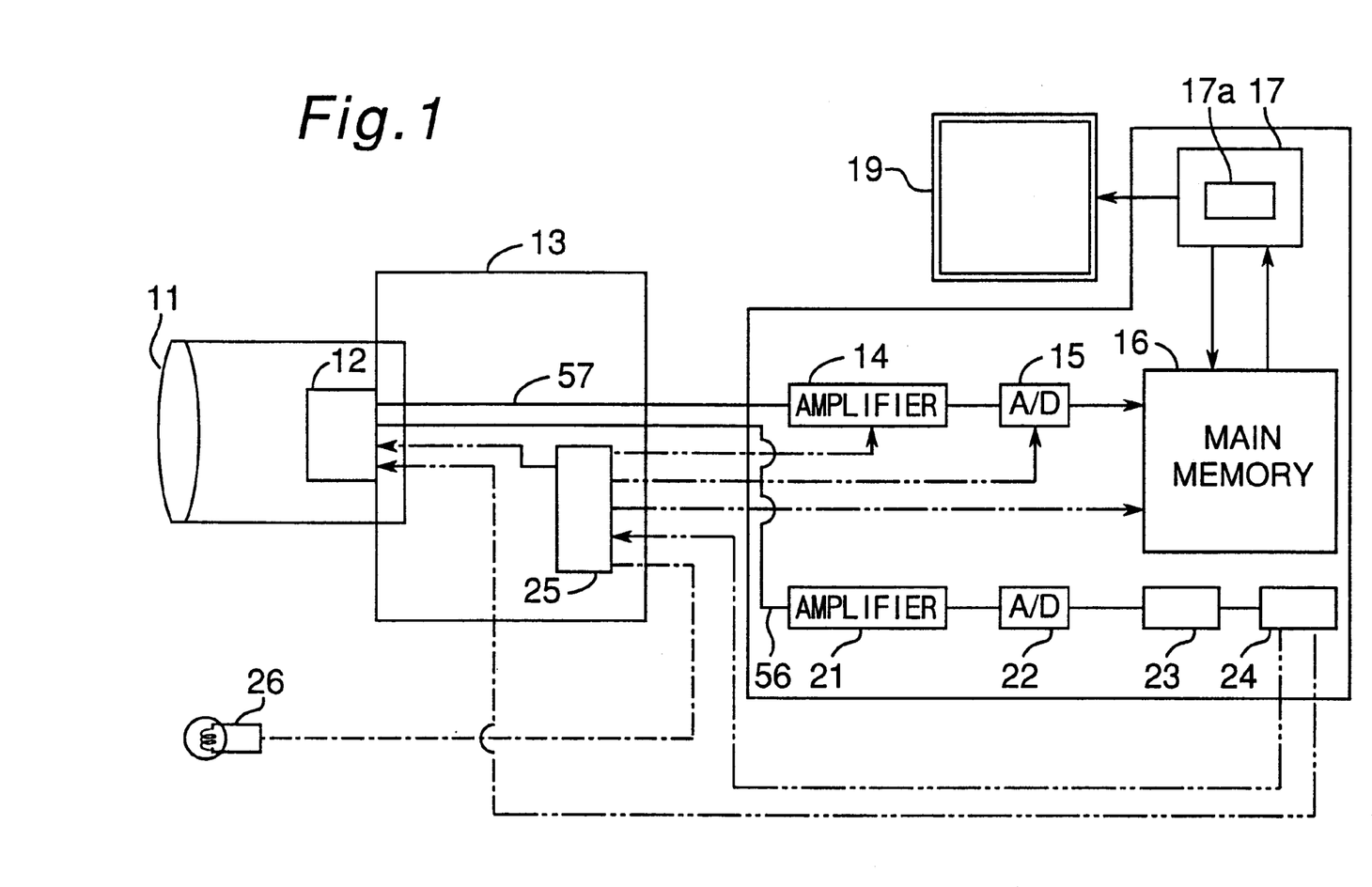
FIG. 1 is a schematic circuit diagram showing an image sensing apparatus according to a first embodiment of the present invention.

In this image sensing apparatus, a main body 13 is equipped with an image sensing unit 12 by which a beam of incident light converged into an image by a lens 11 is converted into an electric signal, wherein an analog signal outputted by the image sensing unit 12 is amplified by an amplifier 14 and thereafter converted into a digital signal by an A/D converter 15, thus being transmitted to a main memory 16. An image processor 17 connected to the main memory 16 comprises a buffer memory 17a and processes the digital signal stored in the main memory 16 so as to reproduce the image. Designated by reference numeral 19 in the figures is a monitor display for displaying the image reproduced by the image processor 17. The image sensing unit 12 is connected to a brightness monitor 23 via an amplifier 21 and an A/D converter 22, and the brightness monitor 23 is connected to a trigger signal generator 24. The image sensing apparatus is further equipped with a controller 25 connected to the amplifier 14, the A/D converter 15, the main memory 16, and the like, so that the controller 25 controls the whole image sensing apparatus. Connected to the controller 25 is an illuminating element 26 for illuminating a subject with illumination light, so that illumination light will be applied to the subject from the illuminating controller 26 in synchronization with the operation of the image sensing unit 12 for an image sensing operation.

Figure 2A:
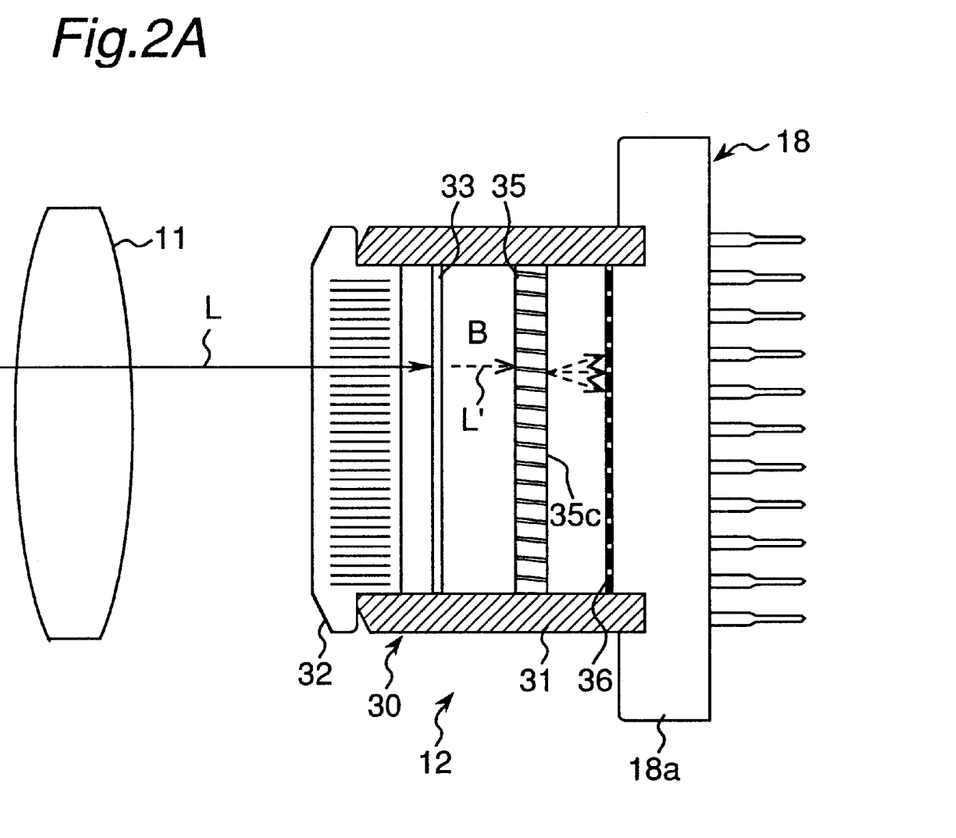
FIG. 2A is a schematic sectional view showing the MCP type II.

The image sensing unit 12 in this embodiment is constructed as shown in FIG. 2A, where an image sensor 18 is fitted to an MCP type II 30.

The MCP type II 30 has an incident window member 32 made of fiber glass and provided at an opening on one end side of a tubular member 31 whose interior is a vacuum, as well as a photo-receptive area 33 and a micro-channel plate (MCP) 35 provided in succession to the incident window member 32. Also, a casing 18a of the image sensor 18 is fitted at the opening on the other end side of the tubular member 31, where the photo-receptive area 36 of the image sensor 18 is opposed to the MCP 35 at a required spacing therefrom.

Figure 2B:
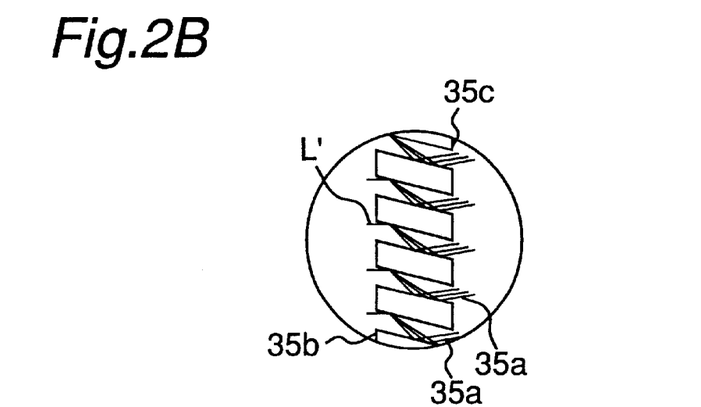
FIG. 2B is a schematic view for explaining the avalanche effect.

A beam of light L reaching on the image sensing unit 12 from the lens system 11 comes incident on the front surface of the incident window member 32 to impinge on the photo-receptive area 33, where it is transformed into an electron flow L' of an intensity corresponding to the intensity of light, thus entering the MCP 35. The MCP 35 is of a known construction, where a large number of holes $35a$, $35a$, . . . are provided as shown in FIG. 2B and a potential difference is given between a front surface $35b$ and a rear surface $35c$. Photoelectrons constituting the electron flow emitted from the photo-receptive area 33 pass the holes $35a$, during which the photoelectrons collide with the walls of the holes $35a$, giving rise to an avalanche phenomenon such that numerous secondary electrons are emitted. As a result, the number of electrons is increased. The photoelectrons are also accelerated by the electric field formed in the MCP 35. In this way, an intensified electron flow is reached on the photo-receptive area 36 of the image sensor 18.

Figure 3:
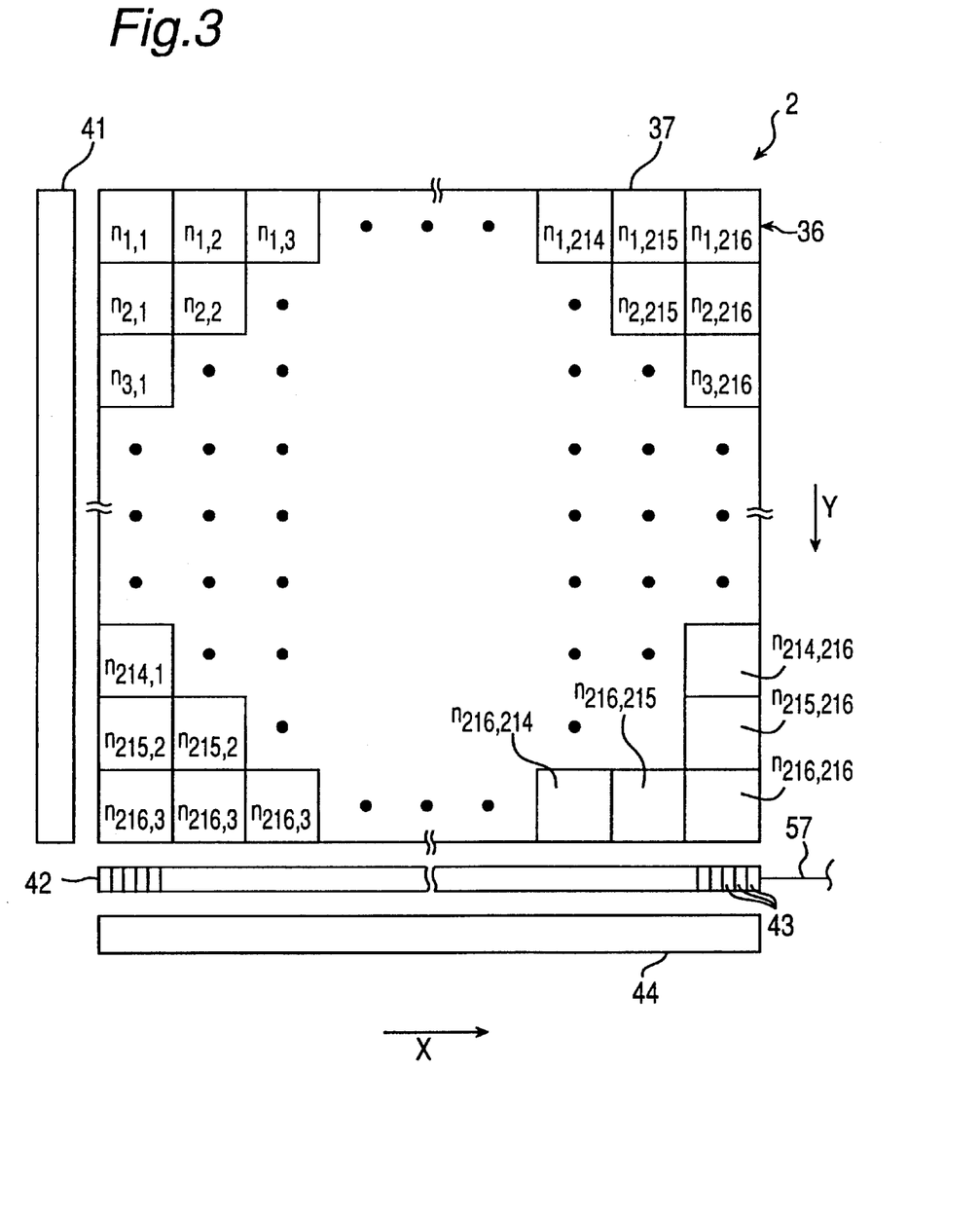
FIG. 3 is a schematic diagram showing the image sensor.
Figure 4:
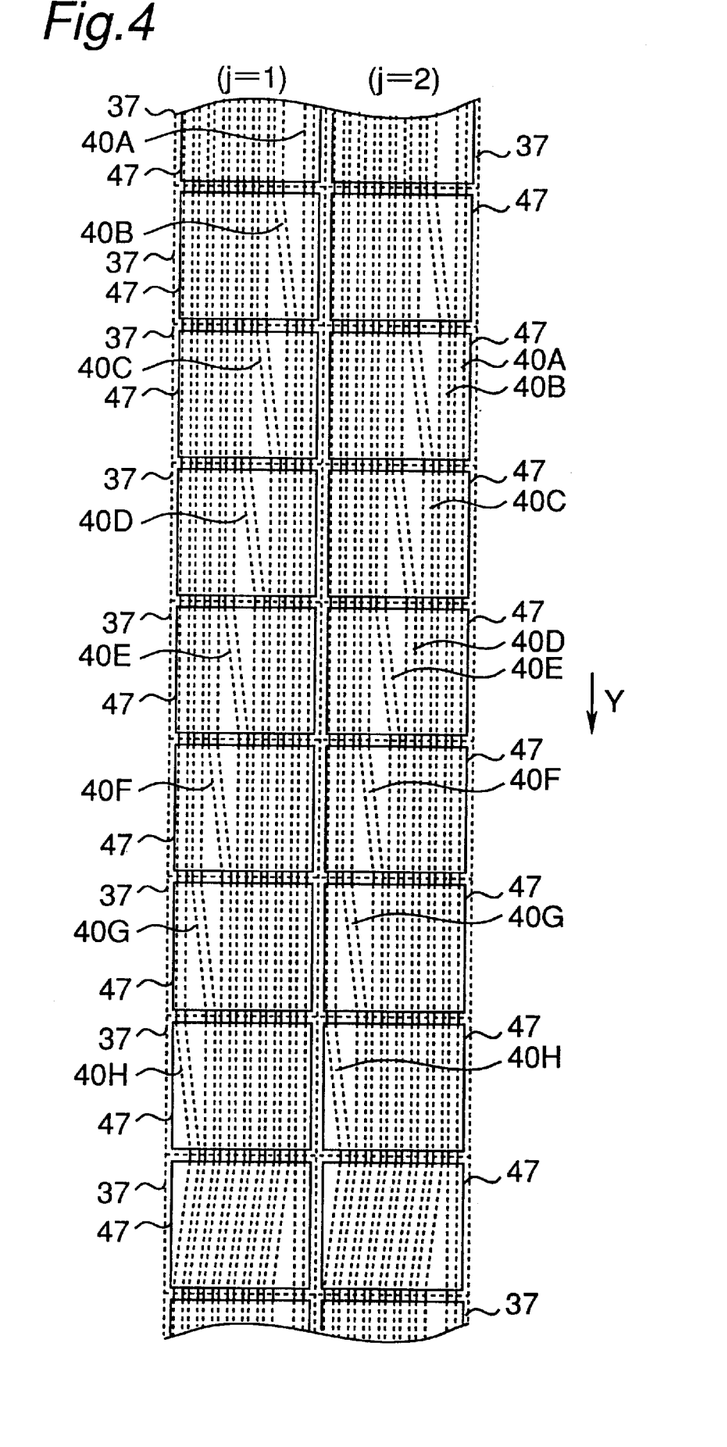
FIG. 4 is a partly enlarged view showing the top surface of the photo-receptive area of the image sensor apparat us of FIG. 3.

As shown in FIG. 3, the photo-receptive area 36 of the image sensor 18 is constituted by 46,656 pixels 37 arrayed in a matrix of 216 rows and 216 columns. In FIG. 3, each pixel 37 is numbered by $n_{i,j}$ (i=1 to 216, j=1 to 216), where the suffix i indicates what ordinal number (row) from the top in the figure the pixel 20 falls upon, and the suffix j indicates what ordinal number (column) from the leftmost in the FIG. 2 the pixel 20 falls upon. A drive circuit 41 for driving dual-function CCDs 40A to 40H described below is provided out side the photo-receptive area 36 in the figure. A scanning CCD 42 is also provided out side the photo-receptive area 36 in figure. A right end charge storage 43 of the scanning CCD 42 is connected to the amplifier 14 and the A/D converter 15 illustrated in FIG. 1. Reference numeral 44 in FIG. 3 is a driving circuit for scanning CCD 42.

In this image sensor 18, with a stacked structure in which sensors 47 and dual-function CCDs 40A to 40H are provided on different surfaces, respectively, the area of the sensors 47 is set to be large.

Figure 7:
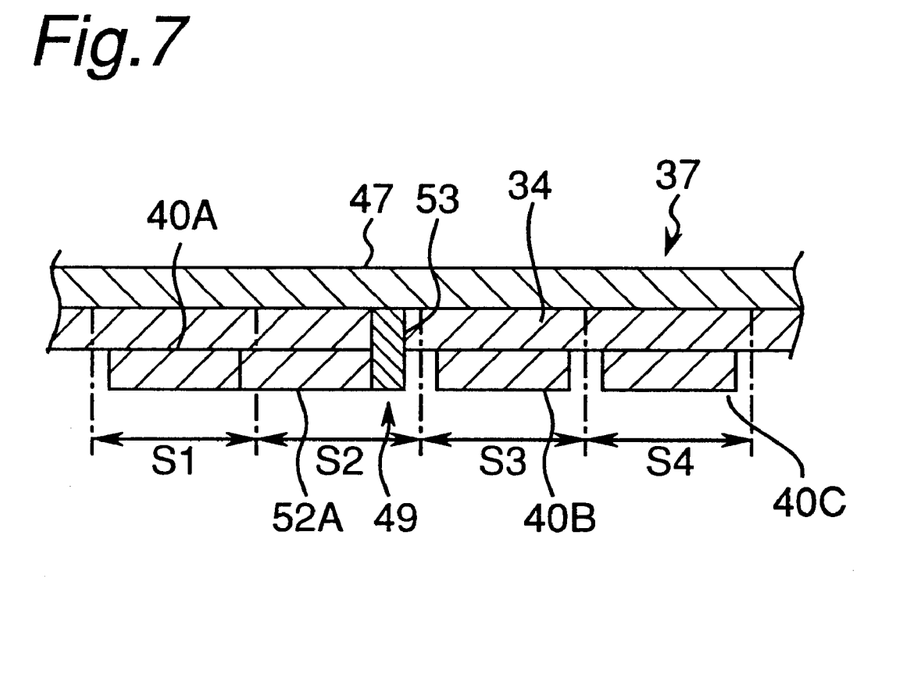
FIG. 7 is a partly enlarged sectional view taken along the line VII—VII of FIG. 6.

More specifically, as shown in FIG. 7, on a side (front surface) of the photo-receptive area 36 on which the electron flow L' which is accelerated and has the intensity corresponding to the intensity of light reaches, a sensor 47 is provided in each pixel 37. This sensor 47 is made of a metal electrode and shape into a square having nearly the same area as each pixel 37.

Meanwhile, as shown in FIG. 7, on the side (rear surface) of the photo-receptive area 36 opposite to the above front surface., the first to eighth dual-function CCDs 40A to 40H are provided.

The first to eighth dual-function CCDs 40A to 40H are of linear shape, each comprising a large number of charge storages 51, and elongated and placed on more than two pixels 37 vertically in the figure of the photo-receptive area 36. In other words, on the rear surface side of the sensors 47 of a plurality of pixels 37, 37, . . . arrayed vertically and constituting the same column, provided are the first to eighth dual-function CCDs 40A to 40H in the order from left to right.

Figure 5:
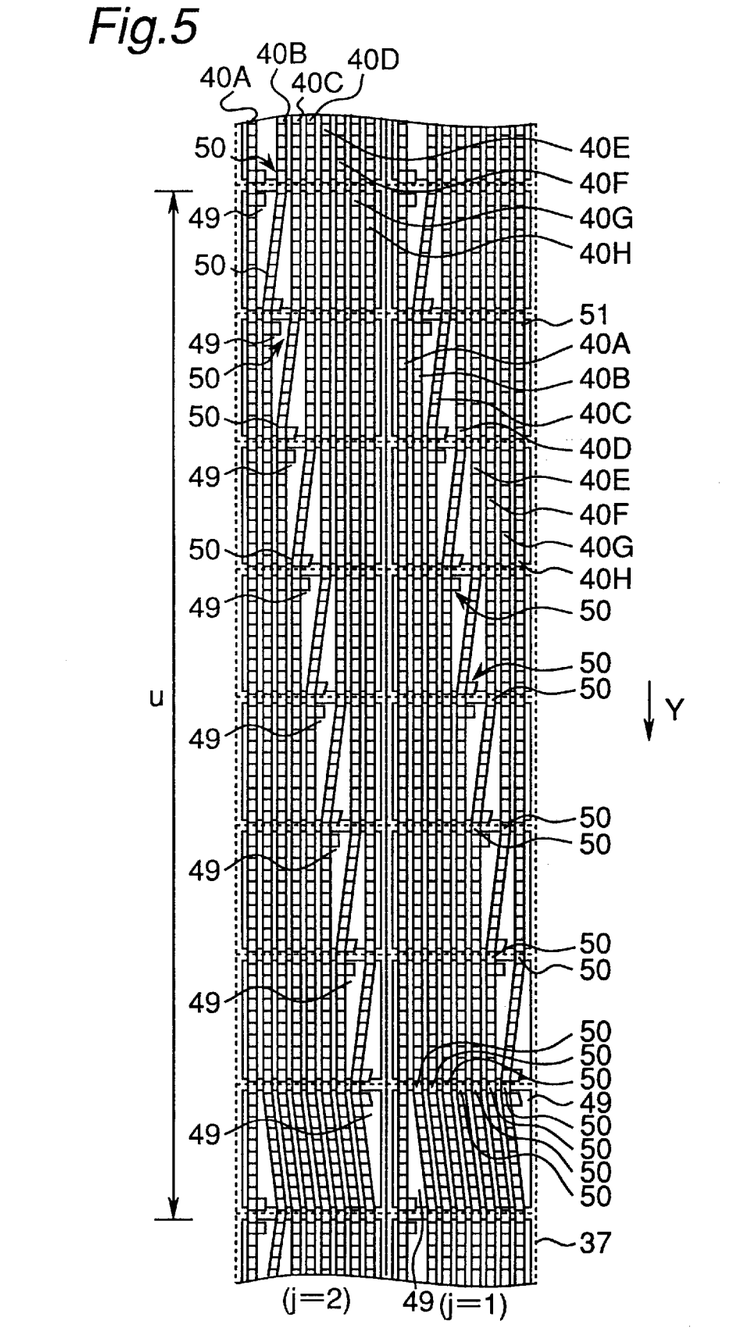
FIG. 5 is a partly enlarged view showing the rear surface of the photo-receptive area of the image sensor of FIG. 3.

As shown in FIG. 5, the first to eighth dual-function CCDs 40A to 40H cover nearly the whole rear surfaces of the pixels 37 constituting the same column. However, in order to provide clearances 49 for placing first and second gating elements 52A, 52B which will be described later, meanders 50, are provided partly in the first to eighth dual-function CCDs 40A to 40H.

Now, the meander structure of the first to eighth dual-function CCDs 40A to 40H is explained with respect to one column with j=1. The same structure is provided with respect to other columns with j=2 and its followings, where meanders 50 are provided in the first to eighth dual-function CCDs 40A to 40H.

Referring first to the structure of the first to eighth dual-function CCDs 40A to 40H, eight pixels 37, 37, . . . arrayed vertically are taken as one unit (unit u), the unit u being repeated by every pixels 37 constituting the same column.

Figure 6:
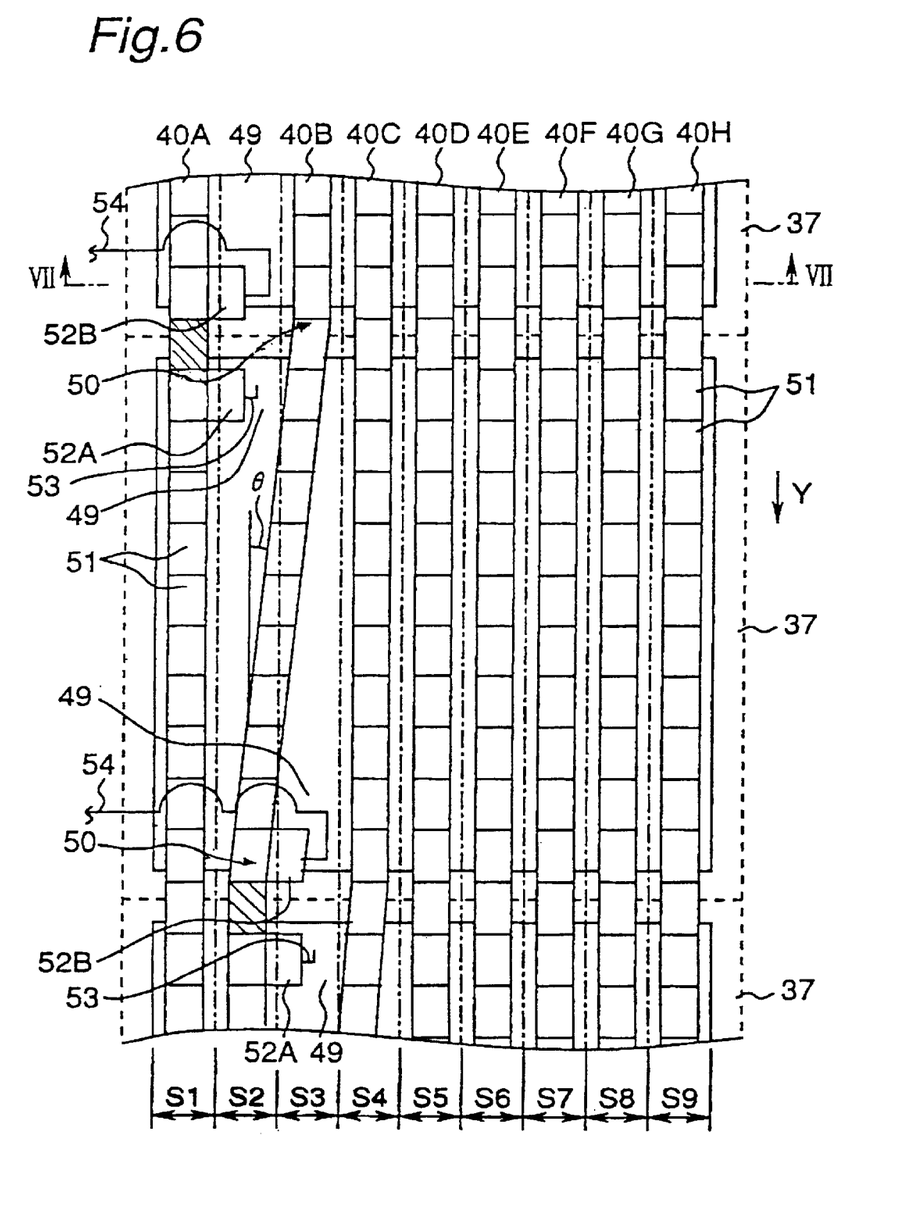
FIG. 6 is a partly enlarged view of FIG. 5.

As shown in FIG. 6, each pixel 37 is divided into nine intervals s1 to s9 with a laterally equal width, and the dual-function CCDs 40A in 40H are placed to the intervals si to s9, respectively. Since eight dual-function CCDs 40A to 40H are placed in nine intervals s1 to s9, there is one of the intervals s1 to s9 left. By making use of the remaining one interval s1 to s9, the first to eighth dual-function CCDs 40A to 40H are obliquely slashed and placed.

For example, in one pixel 37 that is located at the uppermost place in FIG. 5 out of the unit u of eight pixels 37 arrayed vertically, as shown in FIGS. 5 and 6, the first dual-function CCD 40A, which is linear, passes along the first interval s1. Also, the third to eighth dual-function CCDs 40C to 40H, which are also linear, pass along the fourth to ninth intervals s4 to s9, respectively. Meanwhile, meanders 50, 50 are provided in the second dual-function CCD 40B at upper end and lower end sides of the pixel 37, so that it passes along the third interval s3 at the upper end side of the pixel 37 and passes along the second interval s2 at its lower end side.

In a pixel 37 that is located as the second uppermost pixel in FIG. 5 out of the unit u of eight pixels 37 arrayed vertically, the first and second dual-function CCDs 40A, 40B and the fourth to eighth dual-function CCDs 40D to 40H are placed linearly, while meanders 50, 50 are provided to the third dual-function CCD 40C so that it passes along the fourth interval s4 at the upper end side of the pixel 37 and passes along the third interval s3 at its lower end side. Likewise, for the remaining, out of the unit u of eight pixels 37 arrayed vertically, in the third to seventh uppermost pixels 37, 37, . . . in FIG. 5, meanders 50 are provided in the fourth to eighth dual-function CCDs 40D to 40H, respectively in this order, so that clearances 49 are provided within the pixel 37. Further, in the eighth uppermost pixel 37 in FIG. 5 out of the eight pixels 37 arrayed vertically, meanders 50, 50 are provided in the second to eighth dual-function CCDs 40B to 40H, respectively, so that clearances 49 are provided within the pixel 37.

It is noted that the meander angle θ of the meanders 50 of the second to eighth dual-function CCDs 40B to 40H is preferably not more than 10°.

In the first to seventh uppermost pixels 37, 37, . . . out of the unit u of eight pixels 37 arrayed vertically, clearances 49 are defined on both sides of the dual-function CCDs 40A to 40H in which the meanders 50 are provided. For example, in the case of the uppermost pixel 37 out of the unit u of pixels 37, clearances 49, 49 are defined on both right and left sides, in the figure, of the second dual-function CCD 40B having the meanders 50, 50 and being elongated from the third interval s3 to the second interval s2. In the eighth uppermost pixel 37 out of the unit u of eight pixels 37 arrayed vertically, clearances 49, 49 are defined on the left side of the second dual-function CCD 40B and on the right side of the eighth dual-function CCDs 40H, as viewed in the figure.

In the first pixel 37 out of one unit u of pixel 37, an electrically conductive portion 53 protruding from the sensor 47 to the rear surface side is provided in the upper side clearance 49 as shown in FIG. 7. Also, in this clearance 49, a first gating element 52A connected to one of the charge storages 51 of the first dual-function CCD 40A is provided, and the electrically conductive portion 53 is connected to this first gating element 52A.

In a clearance 49 on the lower side of the uppermost pixel 37 out of this unit u of pixels 37, a second gating element 52B connected to one of the charge storages 51 of the second dual-function CCD 40B is provided. To this second gating element 52B, a signal discharge element 54 is connected, and the signal discharge element 54 is connected to a brightness monitor 23 via a monitor CCD (not illustrated), the monitor line 56, the amplifier 21, and the A/D converter 22.

Similarly, in the second to eighth dual-function CCDs 40B to 40H of the unit u of pixels 37, a first gating element 52A is provided at the upper side clearance 49 of each pixel 37, while a second gating element 52B is provided at its lower side clearance 49, as viewed in FIG. 5.

Accordingly, with regard to the first to eighth dual-function CCDs 40A to 40H, first gating element 52A provided to every eighth pixels 37 are connected to the sensors 47, while second gating element 52B are provided to a pixel 37 that is sequentially one greater than the pixel 37 to which a first gating element 52A is provided, as viewed in the figure.

During a monitoring operation, the first gating element 52A is opened so that electric charges are transferred from the sensors 47 to the first to eighth dual-function CCDs 40A to 40H, while one charge storage 51 present between a charge storage 51 to which the first gating element 52A is connected and another charge storage 51 to which the second gating element 52B is connected (the charge storage 51 hatched in FIG. 6) is set to a higher voltage so that electric signals will not be transferred. Also, the second gating element 52B is opened, whereby an electric signal is outputted to the brightness monitor 23. In this state, charge storages 51 corresponding to the set of eight pixels 37 of any one of the first to eighth dual-function CCDs 40A to 40H are connected to the sensors 47 of the pixels 37. The first to eighth dual-function CCDs 40A to 40H have 11 charge storages per pixel 37, in which a total of 88 charge storages 51 are connected to the sensor 47 of each pixel 37 during an image sensing process. Out of these charge storages, such charge storages 51 hatched in FIG. 6 are set to higher voltage so that electric signals are not transferred, as described above. Therefore, electric signals generated in the sensor 47 of each pixel 37 corresponding to 87 frames of images are accumulated in the first to eighth dual-function CCDs 40A to 40H. In addition, during the monitoring, as the first to eighth dual-function CCDs 40A to 40H are actuated, the voltage to be applied to the MCP 35 of the MCP type II 30 is switched on and off synchronously with the actuation, whereby the gating is effected. Also during the monitoring, the MCP 35 is gated so as to allow the electron flow to reach the photo-receptive area 36 for a period of $10^6$ sec. every 1/30 second.

During the monitoring, when the brightness monitor 23 has detected a change in brightness presaging occurrence of a target phenomenon, the image sensing is started. In this image sensing process, the MCP 35 of the MCP type II 30 is gated in synchronization with the actuation of the first to eighth dual-function CCDs 40A to 40H at $10^6$ second interval.

During the image sensing process, after the brightness monitor has detected a change in brightness suggesting occurrence of a target phenomenon, the image sensing is terminated For a signal read process after the image sensing is ended, the first gating element 52A is closed so that electric signals will not be transferred from the sensors 47 of the pixels 37 to the first to eighth dual-function CCDs 40A to 40H. Also, the gating of the MCP 35 is stopped. Further, the second gating element 52B is closed, while the charge storages 51 hatched in FIG. 6, which have been set to a high potential during the image sensing process, are set to the same potential as the other charge storages 51. In this process, in the first to eighth dual-function CCDs 40A to 40H, the charge storages 51 are connected in series from upper end to lower end side of the photo-receptive area 36, respectively.

In this state, the first to eighth dual-function CCDs 40A to 40H are actuated, so that electric signals stored in the charge storages 51 of the first to eighth dual-function CCDs 40A to 40H are transferred parallel and successively from upper to lower side, as indicated by arrow Y in the figure. Below the photo-receptive area 36 is provided a scanning CCD, and the electric signals are transferred from the charge storages 51 of the first to eighth dual-function CCDs 40A to 40H that are located at the lowermost place of the photo-receptive area 36 to the main memory 26 via the scanning CCD, read CCD 42, the read-out line 57, the amplifier 21, and the A/D converter 22.

In a preliminary image sensing for setting an sensing angle and so on (a set-up procedure), the MCP 35 is gated so as to allow the electron flow to reach the photo-receptive area 36 for a period of $10^6$ sec. every 1/30 second, while the set-up operation is carried out by confirming the image by the monitor display.

With the arrangement that an electron flow is irradiated without being transformed into light, since the sensors 47 involving collisions of electrons are subject to heavy deterioration, the time duration during which the sensors 47 are exposed to electron flow should be as short as possible. Since the time required for the image sensing is relatively short, the image sensor is not affected so much in terms of deterioration. Meanwhile, the monitoring and set-up operations would take a relatively long time, as compared with the time for image sensing. However, in this embodiment, because the gating time intervals in the monitoring and set-up operations are set longer as described above, the image sensor 18 can be prolonged in life.

In the image sensing of the embodiment, since electric signals are transferred straight from upper side to lower side by the first to eighth dual-function CCDs 40A to 40H, a frame rate of around $10^6$ frame/sec. is enabled by gating the first to eighth dual-function CCDs 40A to 40H at $10^6$ sec. intervals.

In this embodiment, since the total number of the charge storages connected to the sensor 47 of one pixel 37 during the image sensing process is 87, the number of continuous image frames is 87 which allows a motion image.

Also, in this embodiment, since the transfer direction of the electric signals is not bent, deterioration of the pixels 37 resulting from the electric signal remaining in the charge storage can be prevented from.

Further, since electric signals are transferred in the same direction both during the image sensing process and the signal reading process, the circuit for driving the dual-function CCDs CCDs is simplified in construction.

Furthermore, since the first to eight dual-function CCDs 40A to 40H can store the electric signals during the image sensing and can transfer them during the reading, it is unnecessary to provide any signal read-out CCDs to the photo-receptive area 36. Therefore, the number of the charge storages of the first to eight dual-function.

CCDs 40A to 40H can be increased while an enough area is ensured for the sensor 47.

The present invention is not limited to the above described embodiment, and charge or modified in the various ways.

While in the above described embodiment the sensor is constituted by the metal electrode, the sensor can be constituted by an normal photosensor as a photodiode. In this case, it is preferable to provide the photosensor in the clearance. Further, in this case, a microlens can be arranged in front of the photosensor.

While in the above described embodiment the image sensor is constituted as a rear injection CCD sensor, the image sensor can be constituted as an overlaid CCD sensor.

Further, the MCP type II can be omitted. Namely, a beam from the subject or an electron flow transferred from the beam can be directly applied to the photo-receptive area without losing intensity.

Furthermore, the trigger signal generator is not limited to as described before. For example, an electric signal output unit for monitoring brightness separated from the photo-receptive surface can be provided with out of the image sensor or inside of it.

What is claimed is:

1. An image sensing apparatus comprising:

a plurality of sensors each provided on each of a plurality of pixels forming a photo-receptive area, said sensors generating electric signals in response to brightness of incident light from a subject;

a plurality of dual-function CCDs, respectively coupled to said sensors, for signal storage and read-out of the electric signals, said dual-function CCDs each comprising a plurality of charge storage elements, said dual-function CCDs having substantially linear shape, being elongated over two or more of the pixels, and being arranged parallel to each other;

a plurality of the first gates, respectively connected between one of said sensors and one of the charge storage elements included in one of said dual-function CCDs; and a plurality of second gates, respectively connected between another charge storage element and a signal discharge element, the another charge storage element being positioned apart from the charge storage element to which a corresponding one of said plurality of first gates is connected, during an image sensing process, the electric signals generated in said sensors of the pixels are transferred from said sensors to said dual-function CCDs parallel in one direction and are transferred by said dual-function CCDs parallel in the direction, whereby the electric signals generated in said sensors are stored in the charge storage elements of said dual-function CCDs, and during a signal read-out process, the electric signals stored in the charge storage elements of said dual-function CCDs are transferred parallel in the direction as in the image sensing process, whereby the electric signals are read out of the photo-receptive area via said plurality of second gates.

2. The image sensing apparatus as in claim 1, wherein said dual-function CCDs are placed on a different surface than a surface on which said sensors are placed.

3. The image sensing apparatus as in claim 2, wherein said dual-function CCDs are partly formed into meanders.

4. The image sensing apparatus as in claim 1, wherein said dual-function CCDs are partly formed into meanders.

5. The image sensing apparatus as in claim 4, further comprising:

clearances defined between the meanders provided in a dual-function CCD and another dual-function CCD adjacent to the dual-function CCD in which the meanders are provided.

6. An image sensing apparatus comprising:

a plurality of sensors, respectively provided for each of a plurality of pixels, for generating electric signals in response to incident light from a subject;

a plurality of dual-function CCDs, respectively coupled to said plurality of sensors, for signal storage and read-out of the electric signals, said plurality of dual-function CCDs having a substantially linear shape elongated over two or more pixels and being arranged parallel to each other;

a plurality of first gates, respectively connected between one of said plurality of sensors and one of change storage elements included in one of said plurality of dual-function CCDs; and a plurality of second gates, respectively connected between another charge storage element and a signal discharge element, the another charge storage element being positioned apart from the charge storage element to which a corresponding one of said plurality of first gates is connected, the electric signals generated in said plurality of sensors being transferred via said plurality of first gates to said dual-function CCDs for storage in parallel along a first direction and being read-out from said dual-function CCDs in parallel along the first direction, and wherein said plurality of dual-function CCDs include meanders, said plurality of first and second gates being provided in clearances between meanders of said plurality of dual-function CCDs.

7. The image sensing apparatus of claim 6, wherein said plurality of sensors are located on a different surface of the image sensing apparatus than said plurality of dual-function CCDs.

8. A method of processing image signals in an image sensing apparatus having a plurality of sensors for each of a plurality of pixels and a plurality of dual-function CCDs, comprising the steps of:

a) providing the plurality of dual-function CCDs in substantially linear shape elongated over two or more pixels;

b) generating image signals responsive to light from a subject incident on the plurality of sensors;

c) transferring the image signals from the plurality of sensors to the plurality of dual-function CCDs for storage in parallel along a first direction; and d) reading out the image signals from the plurality of dual-function CCDs in parallel along the first direction, wherein each of the plurality of dual-function CCDs comprise plural charge storage elements, wherein said step a) includes providing the plurality of dual-function CCDs with meanders, the first and second gates being provided in clearances between meanders of the plurality of dual-function CCDs, and wherein said step c) includes transferring the image signals from one of the sensors to one of the charge storage elements of a respective dual-function CCD using a first gate and transferring the image signals from another of the charge storage elements of the respective dual-function CCD to a signal discharge element using a second gate.

9. The method of processing image signals of claim 8, wherein the one charge storage element and the another charge storage element of the respective dual-function CCD are separated away from each other.

* * * * *